(Model Burned.)

J. PARR,

Assignor, by mesne assignments, to H. McCollum, administrator of J. McCollum, dec'd.

Endless Belt-Gearing.

No. 9,135. Reissued Mar. 30, 1880.

Witnesses:
Thomas E. Birch.
Fred K. Haynes

Inventor:
Joseph Parr
by his Attorneys
Brown & Brown

UNITED STATES PATENT OFFICE.

JOSEPH PARR, OF NEW YORK, N. Y., ASSIGNOR, BY MESNE ASSIGNMENTS, TO HENRY McCOLLUM, OF NEW YORK CITY, ADMINISTRATOR OF JOHN McCOLLUM, DECEASED.

ENDLESS-BELT GEARING.

SPECIFICATION forming part of Reissued Letters Patent No. 9,135, dated March 30, 1880.

Original No. 173,332, dated February 8, 1876. Application for reissue filed March 1, 1880. (Model burned.)

*To all whom it may concern:*

Be it known that I, JOSEPH PARR, of the city, county, and State of New York, have invented a new and useful Improvement in Means for Driving Endless Aprons; and I do hereby declare that the following is a full, clear, and exact description of the same, reference being had to the accompanying drawings, which form part of this specification.

My invention consists in novel means for obtaining a more positive motion in endless aprons than has heretofore been obtained and the prevention of the slipping of such aprons on their driving-rollers. The invention is intended more especially to obviate the aforesaid difficulty in cracker-machines, in which the irregularity in driving the endless aprons caused by the aforesaid slipping on the driving-roller has hitherto rendered the cutting of the dough very irregular; but my improvement is capable of application in other machines.

Figure 1:
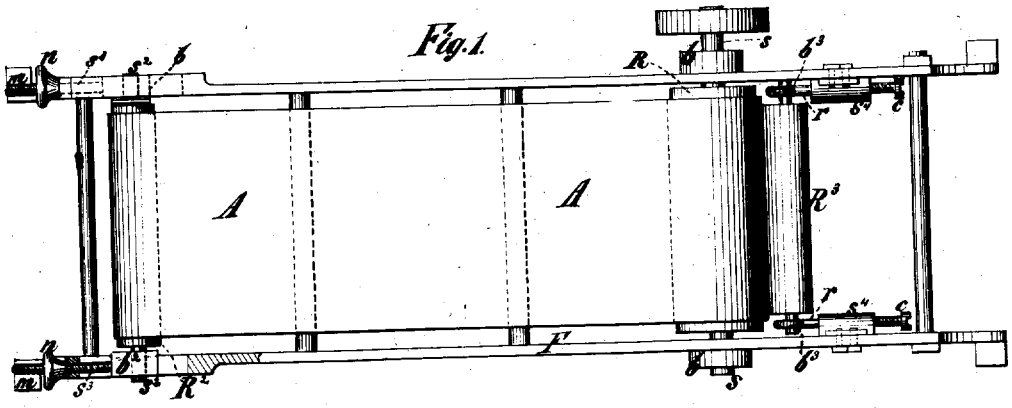
Figure 2:
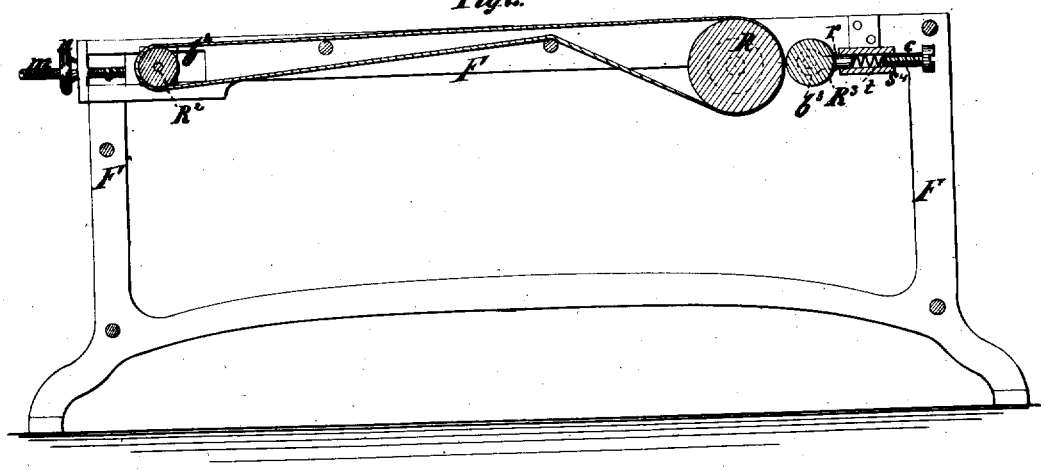

Figure 1 is a plan view of a part of a cracker-machine, showing the top of an endless apron with my invention applied, a portion of the frame being represented at the left-hand side of the drawing as broken away to show the means employed to tighten the endless apron. Fig. 2 is a vertical longitudinal section of the same.

Similar letters refer to like parts in both the drawings.

F is the frame which supports the endless apron A and the mechanism which drives it. The endless apron is stretched upon the driving-roller R and the extension-roller $R^2$. The shaft $s$ of the driving-roller is mounted in fixed boxes or bearings $b$ in the frame F. The shaft $s^2$ of the extension-roller is mounted in adjustable boxes $b^2$, said boxes $b^2$ being fitted to play in slots $s^3$ in the upper side bars of the frame F. From the outer ends of the boxes $b^2$ extend through the end walls of the slots $s^3$ male screws $m$, having nuts $n$ fitted thereon. The said nuts $n$ abut against the said end walls of the slots $s^3$, and when turned serve to slacken or tighten the endless apron A.

$R^3$ is a pressure-roller applied to press upon the apron opposite to the driving-roller at a point where said apron is normally in contact with the periphery of the driving-roller and where the pressure of the said pressure-roller cannot affect the tension of the apron. This pressure-roller $R^3$ is represented as forced toward the driving-roller R with an elastic or yielding pressure by means of springs $t$ and compression-screws $c$, acting upon adjustable bearings $b^3$, which receive the journals of the said pressure-roller. These bearings $b^3$ are represented as formed in the ends of sliding rods $r$, which work in sleeves or boxes $s^4$, bolted or otherwise fastened firmly to the frame F. In the rear ends of these sleeves or boxes are fitted the compression-screws $c$, and between the inner ends of the said compression-screws and the rear ends of the sliding rods $r$ are placed the compression-springs $t$, of coiled wire, rubber, or other suitable material, the tension of which may be varied by turning the compression-screws $c$, by which means the pressure of the pressure-roller $R^3$ toward the driving-roller $r$ and against the apron is regulated as desired.

The endless apron A is made to pass between the driving roller or pulley R and the pressure-roller $R^3$, and it is griped between said rollers R and $R^3$ so strongly that in the proper working of the machine it cannot slip, whether the said apron be slack or tight, different kinds of work sometimes requiring different amounts of tension in endless aprons.

It may be understood by reference to Fig. 2 of the drawings that the pressure-roller $R^3$ presses upon the apron where it is never straight or out of contact with the driving-roller, the pressure being at a point where said apron is normally in contact with the periphery of the driving-roller and where the pressure of the pressure-roller does not affect the tension of the apron, which is only regulated by the action of the screws $m$ on the adjustable boxes $b^2$ of the extension-roller $R^2$, and hence the apron may be left as slack or kept as tight as may be desired, and yet its driving at a regular speed and without any liability to slip is always insured, as it is always griped firmly against the driving-roller.

Instead of springs, a weighted lever or weighted levers may be employed to impart the required pressure to the roller $R^3$ upon the endless apron interposed between the said roller $R^3$ and the driving-shaft R.

I am aware that pressure-rollers with pressure-springs and adjusting-screws have been applied to driving-bands for the purpose of tightening them, and also that pressure-rollers operated by cams and levers have been applied to the drums of windlasses for the purpose of stopping them, and claim neither of such devices as my invention. My invention differs from both of such devices, inasmuch as it avoids the tightening of the apron, and it does not act as a stop, but, on the contrary, prevents stoppage of the apron; and

What I claim as my invention is—

1. The combination, with the apron A and the driving-roller R, of the pressure-roller $R^3$, arranged to press upon the apron at a point where the latter is normally in contact with the periphery of the driving-roller, substantially as described.

2. The combination of the apron A, the driving-roller, the pressure-roller $R^3$, arranged to press upon a part of the apron at a point where the latter is normally in contact with the periphery of the driving-roller, and means, substantially as herein described, of applying an elastic or yielding pressure to the said pressure-roller, substantially as set forth.

3. In combination with the driving-roller R, the pressure-roller $R^3$, sliding rod *r*, sleeves, and inclosed spring, substantially as and for the purposes set forth.

4. In combination with the rollers R and $R^3$, the sliding rod *r*, and spring and sleeve, the adjusting-screw *c*, substantially as described.

JOSEPH PARR.

Witnesses:

FREDK. HAYNES,

THOMAS E. BIRCH.